Jan. 3, 1956

M. MAUL 2,729,290

MULTI-DECK RECORD PERFORATING MACHINES

Filed Nov. 12, 1952

Inventor:
Michael Maul
BY *[signature]*
ATTY.

Jan. 3, 1956

M. MAUL 2,729,290

MULTI-DECK RECORD PERFORATING MACHINES

Filed Nov. 12, 1952

Inventor:
Michael Maul
BY *[signature]*
ATTY.

Jan. 3, 1956　　　M. MAUL　　　2,729,290
MULTI-DECK RECORD PERFORATING MACHINES
Filed Nov. 12, 1952　　　9 Sheets-Sheet 3

Inventor:
Michael Maul

Inventor:
Michael Maul

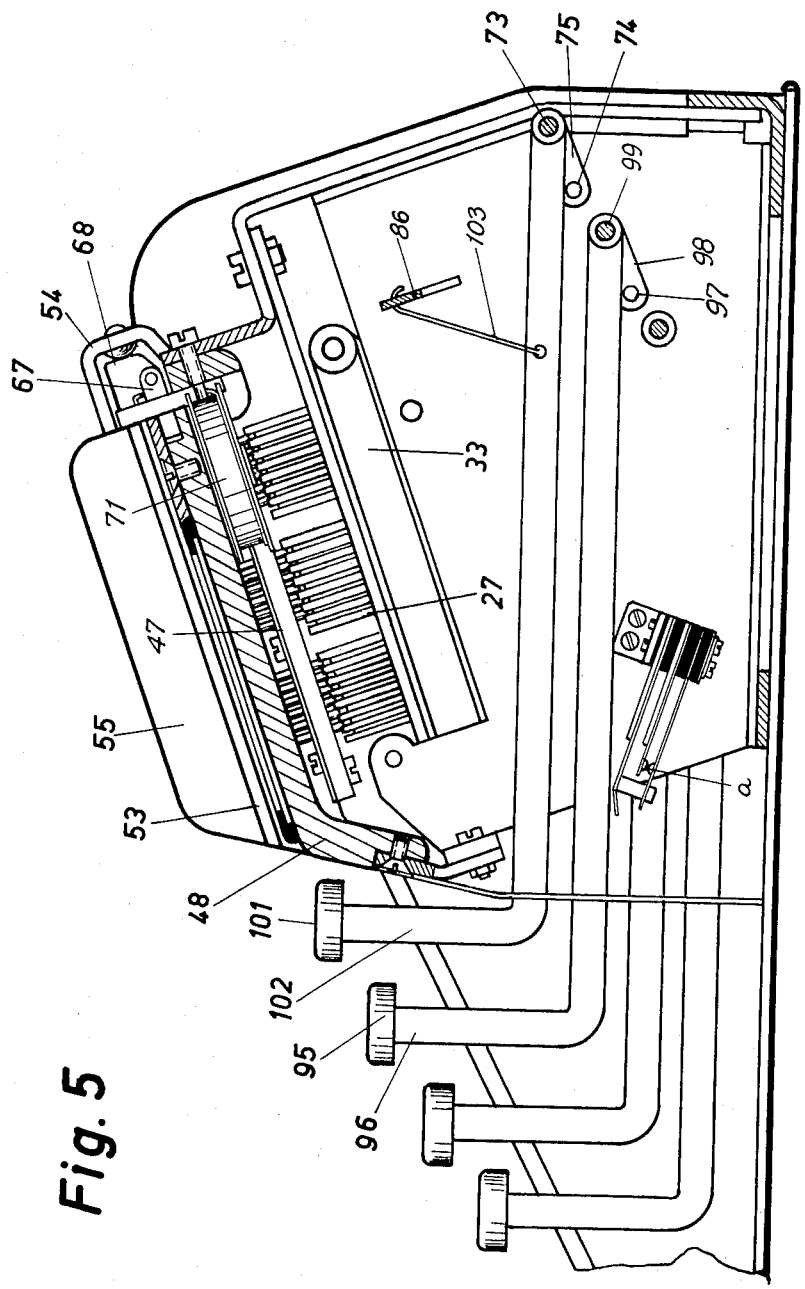

Jan. 3, 1956  M. MAUL  2,729,290
MULTI-DECK RECORD PERFORATING MACHINES
Filed Nov. 12, 1952  9 Sheets-Sheet 6
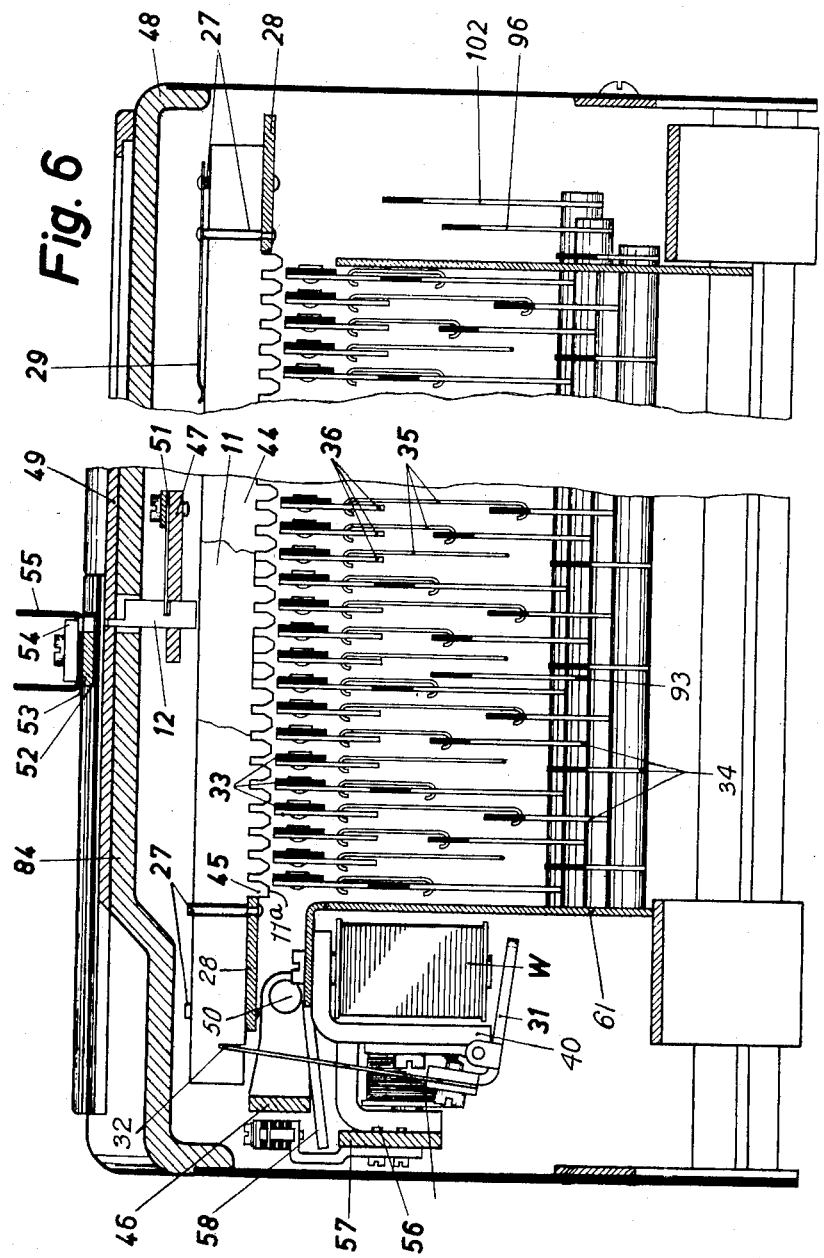
Inventor:
Michael Maul
By [signature]
ATTY.

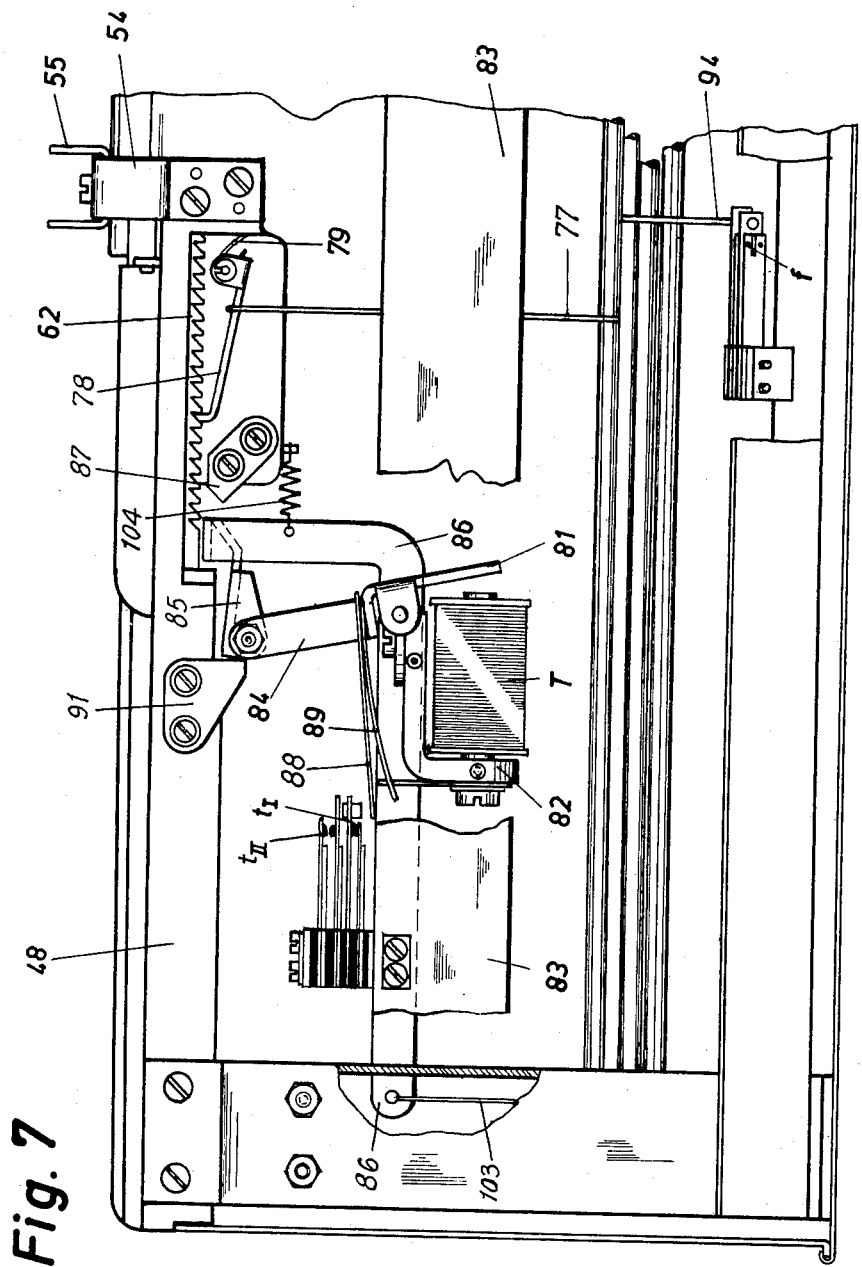

Jan. 3, 1956  M. MAUL  2,729,290
MULTI-DECK RECORD PERFORATING MACHINES
Filed Nov. 12, 1952  9 Sheets-Sheet 8
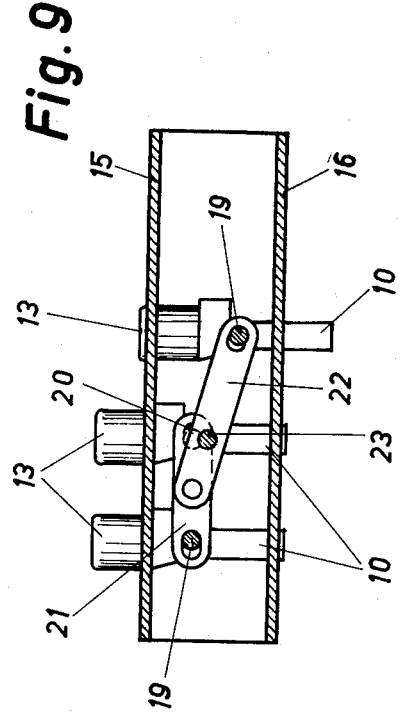
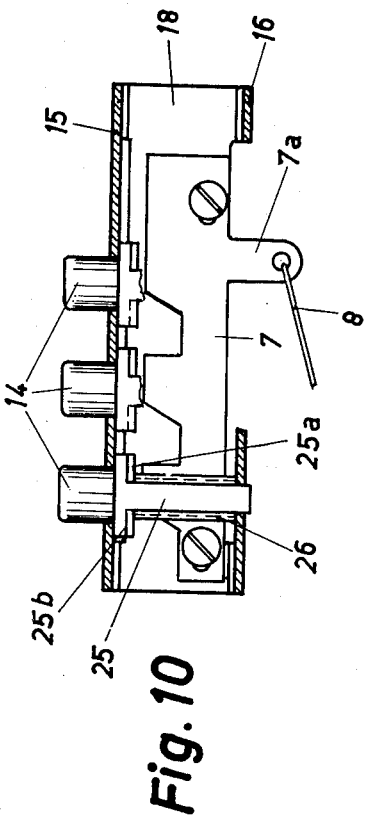
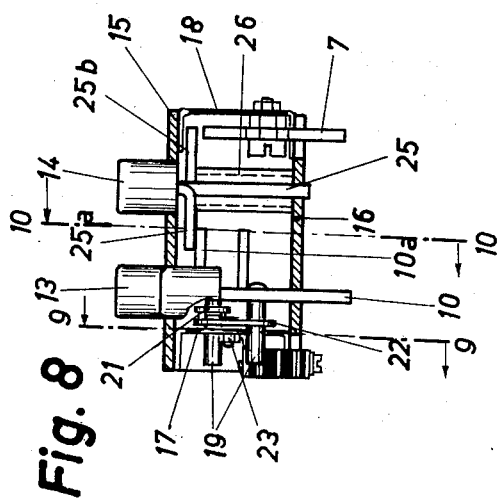
Inventor:
Michael Maul Jan. 3, 1956  M. MAUL  2,729,290
MULTI-DECK RECORD PERFORATING MACHINES
Filed Nov. 12, 1952  9 Sheets-Sheet 9

Inventor:
Michael Maul

United States Patent Office 2,729,290
Patented Jan. 3, 1956

2,729,290
MULTI-DECK RECORD PERFORATING MACHINES

Michael Maul, Schwabach, near Nurnberg, Germany

Application November 12, 1952, Serial No. 319,988

Claims priority, application Germany November 17, 1951

5 Claims. (Cl. 164—112)

It is the object of the present invention to provide a perforating machine for record cards, preferably a machine adapted for the perforation of a plurality of record decks wherein the characters are represented by hole combinations.

The machine according to the invention is characterized in that the card is at all times almost entirely visible so that the data to be perforated can be read directly from the card. Moreover, the machine according to the invention is characterized by a compact and self-contained construction even if the machine is equipped with an alphabet key board.

In order to achieve the object of the invention the latter is based on a punching machine for column by column perforation of record cards wherein the card is fed past a matrix bar and is punched from the rear side, and wherein punch selection is effected by punch selectors provided between the punches and the key levers said selectors being under the control of the key levers. Now, the essential feature of the present invention consists in that for the perforation of multi-deck cards with hole combinational characters the selector bars between the key levers and the punches are in the form of translator bars and in that for each set of punches associated with the plurality of decks an individual set of translator bars is provided each of which can be rendered effective selectively for the operative connection between key levers and punches.

Punching of a card from below, wherein, on the upper side of the card only a matrix bar is provided, thereby obtaining visibility of the card is, for instance, known from the German Patent 266,583. In this machine, however, no operation on a plurality of decks takes place, therefore no deck selection is required and the selector bars do not serve, as in the invention, at the same time as translator bars for hole combination control which may be set selectively for cooperation with any one of the plurality of sets of punches.

Punching machines for multi-deck cards using translator bars are also known (for instance U. S. Patent 2,210,552). In the latter machines, however, punching is not effected from below, the translator bars are not constructed at the same time as selector bars for the punches and, moreover, they are not provided between the key levers and the punches below the card, but the punches are arranged above the card. Therefore there is only a limited visibility. Moreover the deck selection is not effected by providing an individual set of translator bars associated with each set of punches whereby in the machine according to the invention a compact construction and, in spite of the multiple arrangement of sets of translator bars, a small and self contained machine is obtained.

A preferred embodiment of the invention includes a number of further advantageous features. Among these there is, above all, an arrangement which makes it possible that during the key movement which necessarily takes place downwards, the displacement of the translator bars is caused, though the latter are arranged above the keys. The same arrangement also permits a uniform key actuation for all keys and relieves the key levers from the work of displacing the translator bars. These advantages are obtained in that the displacement of the translator bars is effected by a resilient power drive under the control of all key levers, the translator bars which are not to be displaced remaining locked under the control of the actuated key against the displacement power of said drive so that only the translator bars which are to be displaced can follow the power drive.

A further advantage of the embodiment consists in that the shifting of the translator bars necessary for deck selection is in operative connection with the return of the card carriage to its home position. Therefore, upon deck change it is not necessary as in known machines (for instance U. S. Patent 2,210,552) to use two particular manipulations, namely deck shifting and carriage return, but by a single controlling action both manipulations are caused simultaneously. Thus, together with the deck shifting the card will at the same time also be fed to a position in which it is ready for beginning the column by column perforation of the next deck anew.

The preferred embodiment of the invention is illustrated in the accompanying drawings:

Fig. 5 shows the machine in vertical section as viewed from the right.

Fig. 6 shows a longitudinal section through the machine on the section line 6—6 of Fig. 3.

Fig. 7 shows a rear view of the machine with the cover removed from which particularly the feed for the card carriage may be seen.

Figs. 8 to 10 show the device for deck selection.

Figure 11:
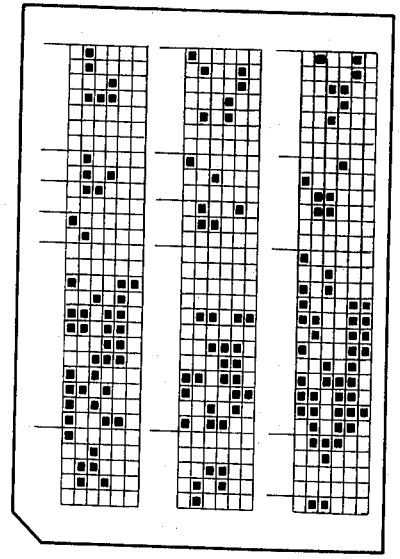
Fig. 11 shows a card punched in the machine.

Punching is effected in a triple deck card as shown in Fig. 11. Each deck consists of 30 columns each having six hole positions. The perforation is effected in combinations. The translation of a key value takes place by translator bars arranged below the punches. For each deck there is provided an individual set of punches. Accordingly the machine includes three sets of punches each having six hole positions. In accordance with the six hole positions of one deck six translator bars 11 are required for each deck by which the respective key value will be transformed into the associated hole combination. Each of the sets of translator bars provided below the sets of punches can be selecttively rendered effective for the operative connection between key levers and punches.

*Deck selection*

Figure 4:
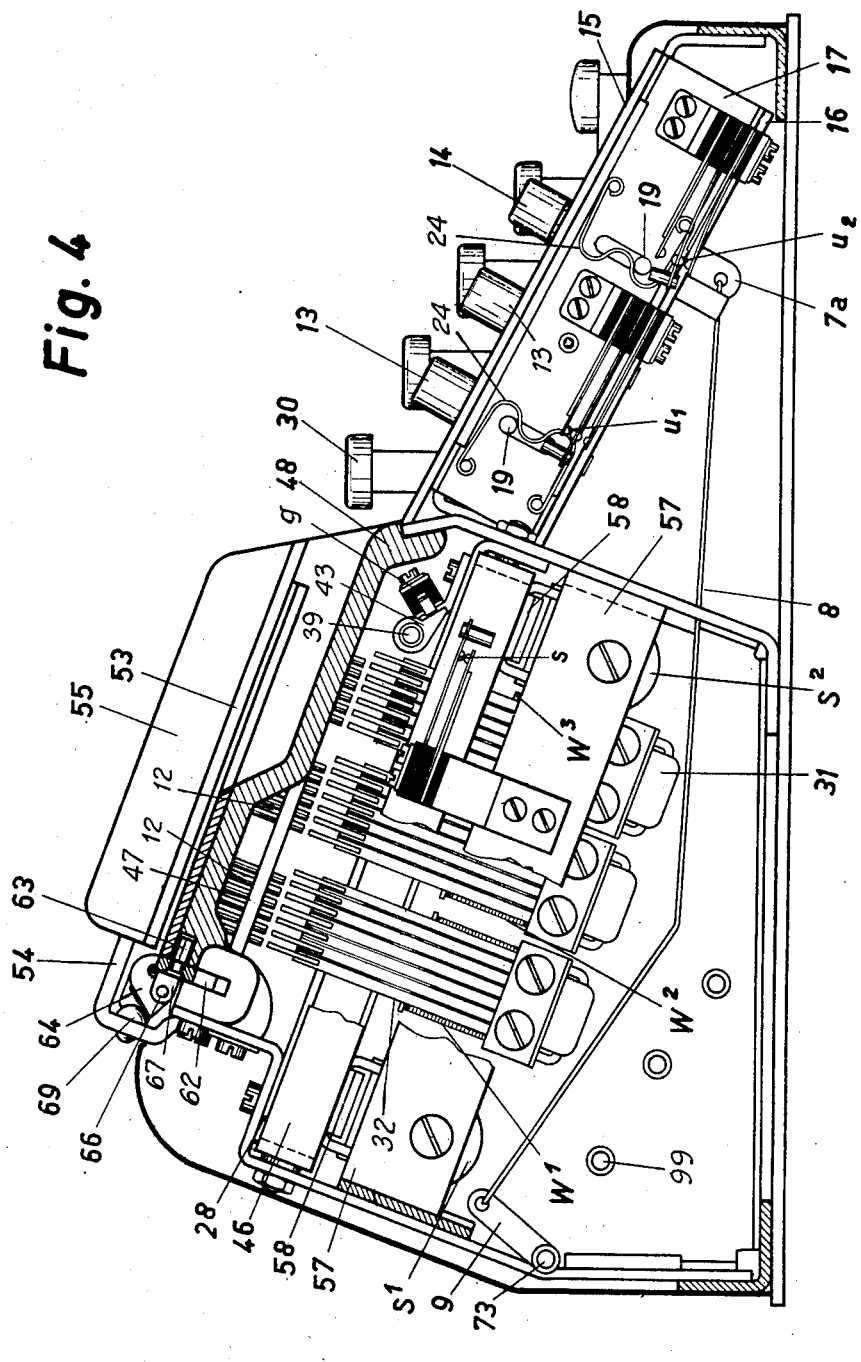
Fig. 4 shows the machine in vertical section as viewed from the left.

The displacement of the translator bars 11 is effected by the magnets $W^1$, $W^2$ and $W^3$ (Fig. 4), which will be referred to later on. A switching device is provided by means of which one of the three magnets can be included in the current circuit of the machine. The others, however, remain switched off so that their translator bars will not be displaced and therefore no perforations will be effected in this deck.

Figure 1:
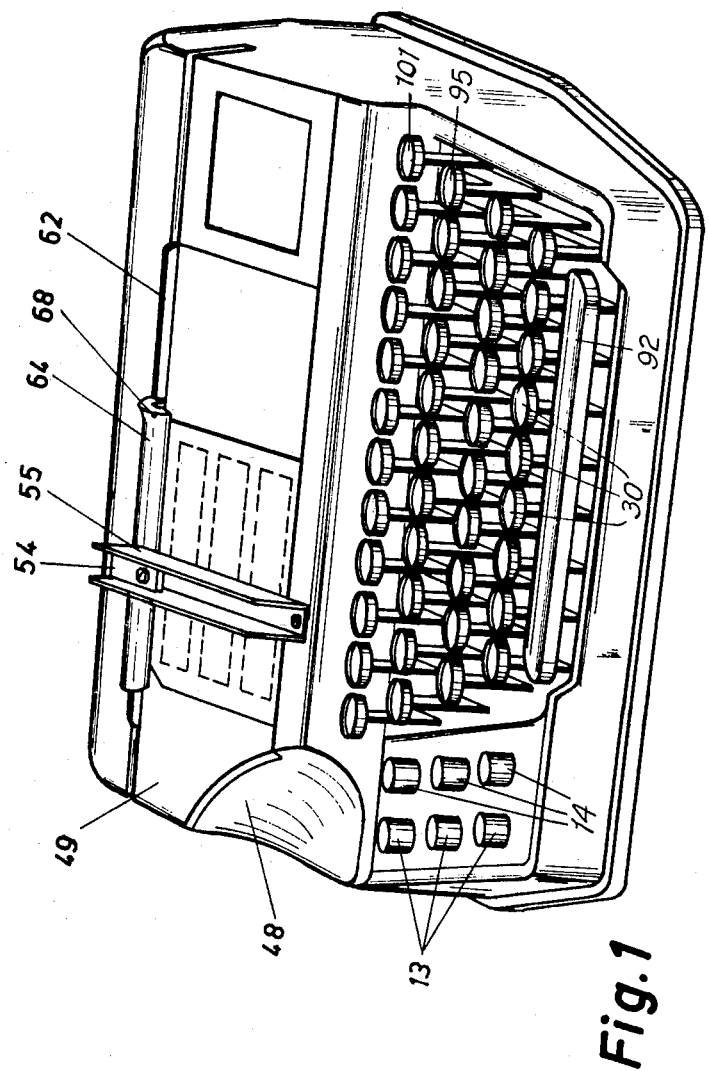
Fig. 1 shows a perspective total view of the machine.

Deck selection can be effected by the keys 13 as well as by keys 14 (Fig. 1). Upon actuation of keys 13 the deck selection will be effected without thereby releasing the carriage return. With the keys 14, however, the deck selection takes place together with the carriage return. The keys are in operative connection in such way that always only one key can be depressed and therefore only one deck is selected.

Both switch contacts $u^1$ and $u^2$ (Fig. 4) are actuated by the three keys 13 causing thereby switching in of one of the three selector magnets W. The keys 13 and 14 are guided in the plate 15 (Fig. 8) and with their shaft 10 or 25 respectively in plate 16, said plates being connected with each other by the two brackets 17 and 18. Adjacent to the keys 13 there is provided a device which permits only one key to be depressed at the same time. Pins 19 extending through the brackets 17 and actuating the contacts $u^1$ and $u^2$ respectively (Figs. 4 and 8) are provided on both of the outer keys. The left hand key actuates the contact $u^1$ for selecting the upper deck. If the middle key is depressed neither of the two contacts u will be actuated whereby the middle deck will be selected. The right hand key actuates the contact $u^2$ which selects the lower deck.

A short pin 20 (Fig. 9) extending only up to the lever 21 is provided on the middle key. The lever 21 is rotatably mounted on the lever 22 which an rock about the bolt 23. The latter is fast in the bracket 17. Moreover through the lever 21 there extends also the pin 19 of the left hand key and through the lever 22 the pin 19 of the right hand key. The leverage has been so chosen that at any one time only one key can be in the lower position. If for instance the middle key is depressed it will tend to turn the lever 21 in a clockwise direction about its pivot. Since, however, the left hand key encounters the upper plate 15 the pivot is thereby pressed downward and the lever 22 will be rocked in a counterclockwise direction about the bolt 23. The lever 22 will then take with it the right hand key 13. The keys are held in their respective position (Fig. 4) by the two detent springs 24.

If one of the keys 14 is depressed simultaneously with the deck selection the carriage release will be caused. The keys are guided with the stem 25 in the lower plate 16 and are pressed upward by spring 26 (Figs. 8 and 10). On the stem there is a lug 25b extending to the right (Fig. 8) and a lug 25a extending to the left. If the key 14 is depressed it will take with it the associated key 13 for the deck selection, by means of the lug 25a engaging the lug 10a of the stem 10. The lug 25b will encounter the inclined edge of the bar 7 and will move the latter to the right (Fig. 10). Attached to a lug 7a of the bar 7 is a link 8 which transfers this movement to the arm 9 (Fig. 4) the latter rotating in a clockwise direction and releasing the carriage return which will be referred to later. After release of the key 14 the latter will be returned to its initial position by spring 26, the respective key 13, however, will remain in the depressed position.

*Translating of the key values into hole combinations*

The displacement of the translator bars 11 in the longitudinal direction in different combinations is not effected directly by the character keys 13 but by the displacement magnets W (Figs. 4 and 6) through their armatures 31 and leaf-springs 32, one of the latter being provided for each translator bar and being resiliently connected thereto. By means of their yokes 40 the selector magnets W are fastened to the side wall 61. The translator bars 11 rest upon two stirrups 28 and are guided by pins 27. The translator bars are urged towards the stirrups 28 by the spring 29.

Figure 2:
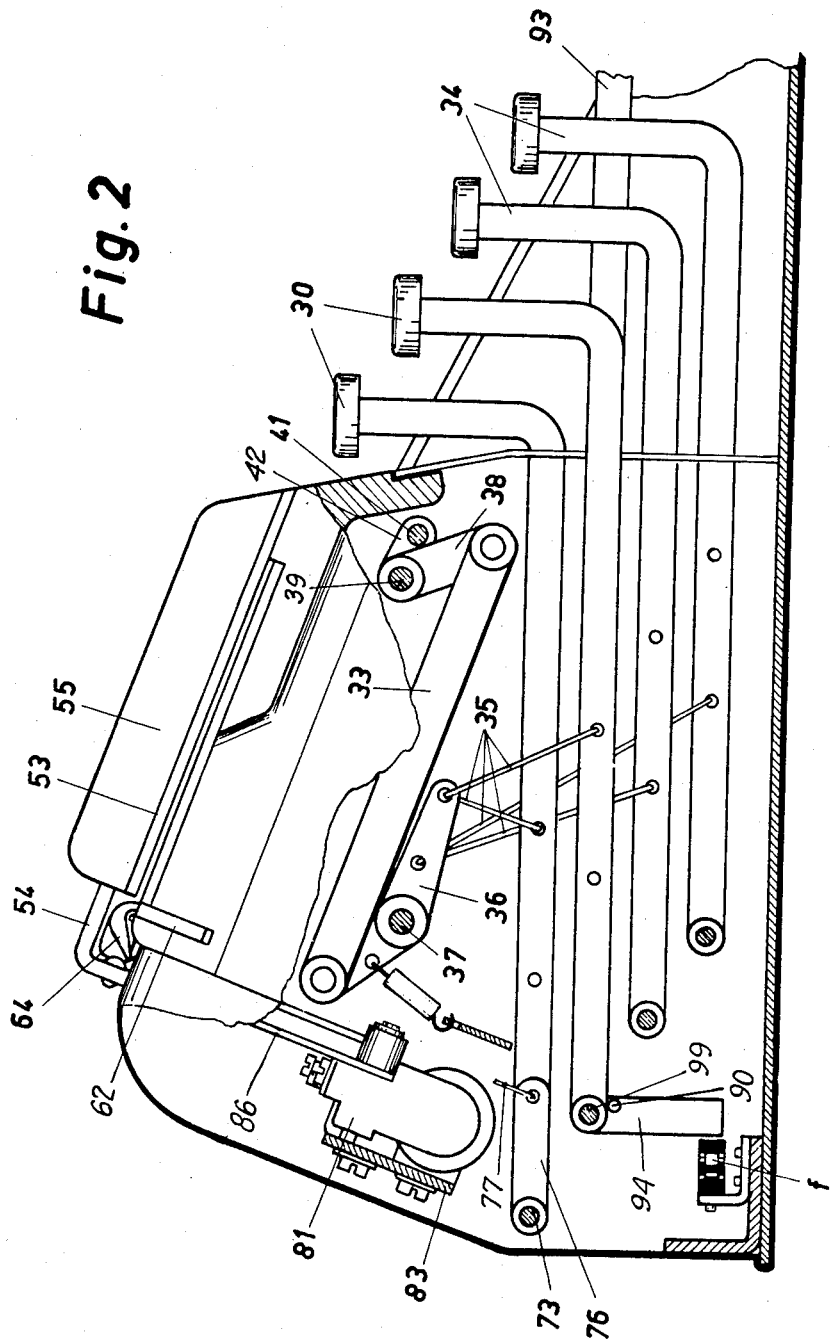
Fig. 2 shows a section across the machine from which particularly the arrangement of the key levers may be seen.

The translator bars 11 which are not to be displaced are locked against movement by teeth 11a which are provided on the translator bars in accordance with the different combinations. Locking is effected by the bars 33 (Figs. 2, 3 and 6) which are rocked upward by the keys. Each key 30 has a locking bar 33 associated therewith. If a key is actuated it will rock its key lever 34 downward. Thereby the lever 36 mounted upon the pivot 37 will be taken with the key lever by means of the pull rod 35. To the left hand end of lever 36 (Fig. 2) there is pivoted a locking bar 33 which is rocked upward between the teeth of the translator bars. In order to obtain an almost parallel rising of the locking bar 33 the right hand end thereof is pivoted to the lever 38 which is mounted on the shaft 39. The connection and the leverage relations between 34 and 36 have been so proportioned that all locking bars perform approximately the same displacement movement with respect to the translator bars.

On its upward movement the lever 38 will take with it the bar 41 which extends over all the levers 38. The bar 41 is attached to two arms 42 which are fast upon the shaft 39 and turn the latter in a counterclockwise direction of the bar 41. Moreover the arm 43 (Fig. 4) is mounted on the shaft 39. It actuates the contact g which closes the current circuit through the selector magnet W. When energized the latter will displace the unlocked translator bars 11 to the left (Fig. 6) by means of the springs 32. Translator bars of which the noses are in engagement with the locking bar 33 cannot follow this movement.

The locking bars 33 must be separately held since they would otherwise yield to the displacing force of the magnet W and would be bent thereby. The holding is effected by the bars 44. In their external shape they are constructed exactly like the translator bars 11. The only difference consists in that on each of the bars 44 there is provided a nose for each key. One bar 44 is provided on the right hand side (Fig. 4) of each set of translator bars. Like the translator bars they are also held against the stirrups 28. In addition to the normal noses the bars 44 have a nose 45 engaging the left hand stirrup 28 (Fig. 6) and preventing movement to the left. On lifting of the locking bars 33 the latter pass into the recesses between the noses of the bars 44, thus preventing the locking bars 33 from moving together with the translator bars 11 in displacement of the latter.

*Punching*

During their movement to the left (Fig. 6) the left hand ends of the unlocked translator bars 11 will pass over the punching yoke 46 which is mounted upon the shaft 50. It may be rocked upward by two punch magnets $S^1$ and $S^2$ which become effective, in a manner to be described later, after energization of the selector magnet W and the feed magnet T. Thereupon the yoke 46 will take with it upwardly the displaced translator bars which in turn will take with them the punches 12 and will press the same through the card.

Figure 3:
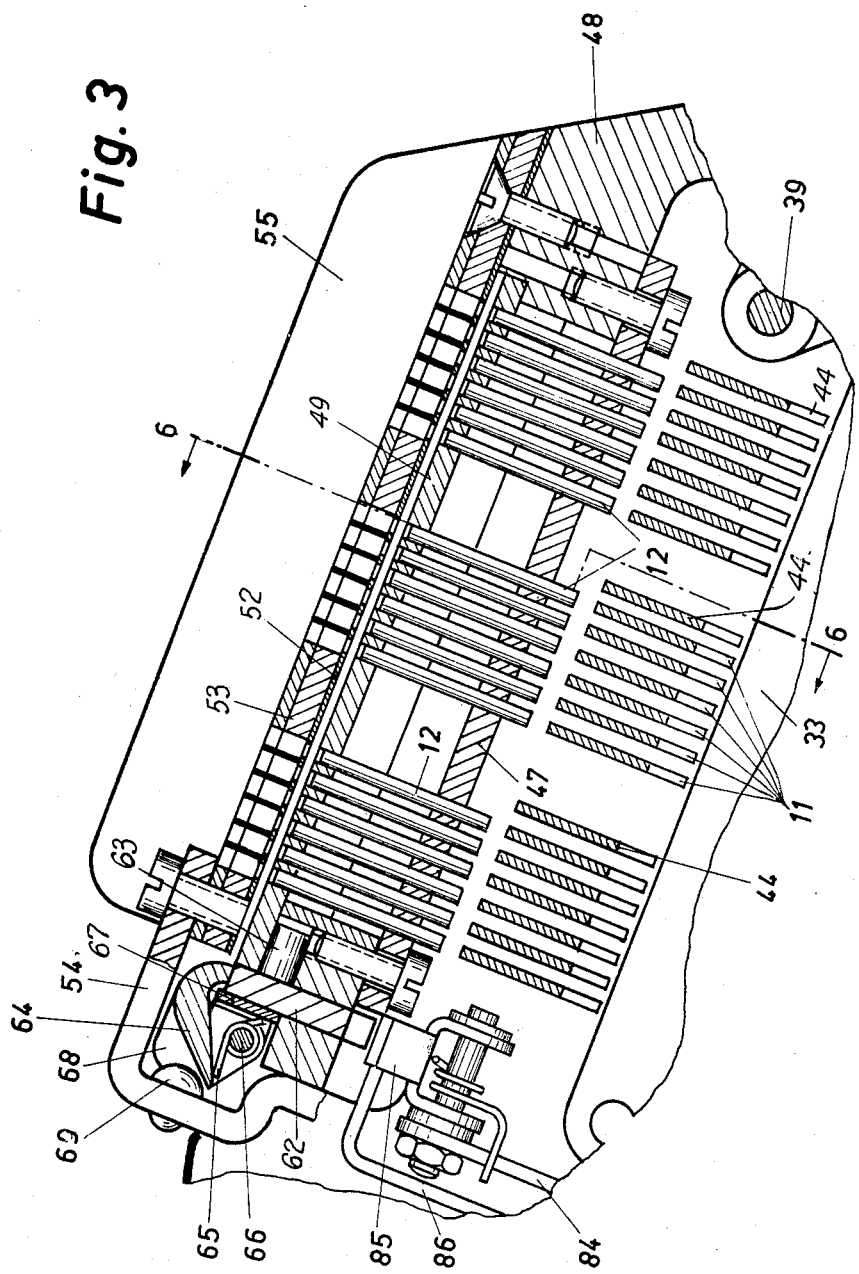
Fig. 3 shows the arrangement of the punches and of the translator bars in section.

The punches 12 are guided in the bar 47 fastened to the card bed, and in the plate 49. The punches are held in their home position by the leaf springs 51. The matrix 52 is above the card and is fastened to the matrix carrier 53. The latter is fastened by its front end immediately to the bed 48 while its rear end is fastened thereto through the stirrup 54 (Fig. 3). Above the matrix 53 there is a channel 55 which prevents the punchings from falling into the card and conducts said punchings forwardly.

Both magnets S are secured to the cross stirrup 57 by means of their yokes 56. The actuation of the punching yoke 46 is effected by the armatures 58 which are mounted on the magnet yokes 56 of the two magnets $S^1$ and $S^2$. The armature of the one punch magnet will also actuate the contact s (Fig. 4) the function of which will be referred to later in connection with the description of the circuit diagram.

After the punching has been finished and after the return of the key lever to its home position, the selector magnet W will also be deenergized so that its armature will drop and will be restored to the home position by the leaf springs of the undisplaced translator bars or of the holding bar 44. The displaced selector bars will then be moved by their leaf springs.

Card feed

Insertion of the card takes place at the left hand side of the machine (Fig. 1). After the card has been inserted the deck to be punched is selected by means of keys 14 and simultaneously therewith the card carriage 62 is released. Under spring tension the carriage will then run to the right hand or starting position and will take the card with it. On actuation of a character key 30 the carriage will be shifted one step to the left. When punching of one deck of the card is completed the card will have again reached the left hand position. If now entries are also to be punched in another deck, then another deck is selected by the keys 14 and the carriage is again moved to its right hand position. The actuation of the keys 13 causes only the deck change but has no influence on the card feed. When punching of the card is finished it will have reached the left hand position and may be removed from the machine.

The card carriage 62 (Fig. 3) is guided in the bed 48. Sliding off is prevented by the pins 63. On the card carriage 62 a card gripper bar 64 is provided which clamps the card to the carriage under the pressure of the spring 65 during the punching operations. The gripper 64 is mounted on the spindle 66 which is mounted in the bracket 67 which is fastened to the card carriage 62. On the right hand end of the gripper 64 (Fig. 1) a projection 68 is provided. When the carriage reaches the left hand end position the projection of the gripper will pass under the stop 69 which will rock the gripper in a counterclockwise direction (Fig. 3) thus releasing the card.

Carriage release is effected by the keys 14 as has already been described. If one of the latter is depressed the lever 9 (Fig. 4) is drawn forwardly by means of the bar 8 and the shaft 73 will be rocked. Fixed to the latter is the lever 76 (Fig. 2) from which an actuating bar 77 extends to the rocking pawl 78 (Fig. 7). Therefore on depression of a key 14 the pawl will be removed from the teeth of the card carriage 62 thus releasing the latter so that a spiral spring disposed in the spring casing 71 (Fig. 5) can move the carriage to the left by means of a cord (Fig. 7). If the key 14 is again released, the locking pawl 78 and therewith all intermediate members up to key 14 are restored to the home position by means of spring 79.

On actuating a character key the contact $g$ is closed as has already been described. Thereby in addition to the current circuit through the selector magnet W the current circuit through the feed magnet T (Fig. 7) is closed which will be energized and will attract its armature 81. The latter is mounted on the magnet yoke 82 by means of which the magnet T is fastened to the cross bar 83. On the arms 84 of the armature 81 is mounted the pusher pawl 85 which is resiliently urged against the teeth of the carriage 62. In the rest position the pawl is held disengaged from the teeth by means of the lever 86. On its movement to the right (Fig. 7) the pawl 85 will slide from the lever 86 and will pass into the teeth of the card carriage thus taking the latter with it up to the stop 87. The locking pawl 78 will then engage the next tooth whereby the carriage will be fed one step to the right.

At the same time the spring 88 which is fastened to the armature 81 will actuate the contacts $t_I$ and $t_{II}$ of which the function will be referred to later in connection with the description of the circuit diagram. If the current through the magnet T is interrupted the armature 81 will drop and by means of spring 89 will be restored together with pusher pawl 85 to the home position which is determined by stop 91.

If the skip key 92 is actuated it will rock the key lever 93 (Fig. 2) which in turn, by means of a pin 90 will take with it the arm 94, said arm actuating the contact $f$. The latter closes the current circuit through the magnet T and interrupts the latter through the magnets W and S.

The current circuits will be referred to later on in connection with the description of the circuit diagram. By energization of the magnet T shifting for one step will be effected as has already been described.

On depression of the release key 95 (Fig. 5) the key lever 96 which is mounted on the shaft 99 will be rocked. The key lever 96 will thereby open the contact $a$ and by means of pin 97 will take with it the lever 98 on the shaft 99. The shaft 99 serves also for the mounting of the character key levers. Moreover the arm 94 (Fig. 2) which actuates the contact $f$ is fast on the shaft 99. The arm 94 may also be rocked by the skip key as has already been described. By means of the contacts $a$ and $f$ an automatic interrupting current circuit will be established through the feed magnet T, the latter being continuously energized and deenergized whereby the carriage is fed to the left (Fig. 1) step by step. The details of the current circuit will be referred to later on.

Figure 12:
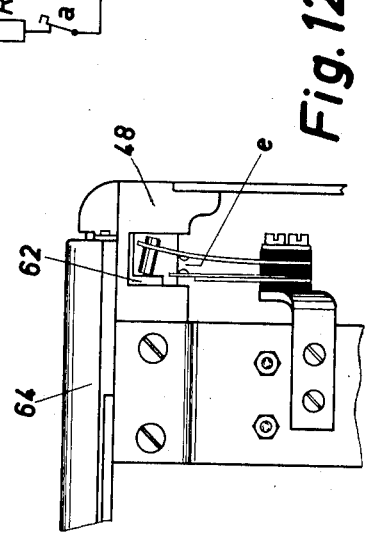
Fig. 12 shows a detail as viewed from the rear side of the machine, said detail illustrating the arrangement of a contact.

If the carriage is in the insertion position the actuation of any character key must not cause any response of magnets. This is obtained by the contact $a$ (Fig. 12) which is opened by means of the card carriage 62 in the insertion position thus interrupting the entire current circuit of the machine.

The back space key 101 (Fig. 5) operates purely mechanically. When it is actuated it rocks the key lever 102 which is freely mounted on the shaft 73. The lever will then take with it, by means of pin 74, the lever 75 which is fast on the shaft 73. Thereby the shaft 73 will be rocked and through the lever 76 and the bar 77 (Fig. 7) the locking pawl 78 will be withdrawn from the rack of the card carriage as has already been described. At the same time the lever 86 will be drawn downwards by bar 103. The lever 86 (Fig. 7) is, like the armature 81, mounted on the yoke 82 of the feed magnet and rocks in counter-clockwise direction. Thereby the pusher pawl 85 loses its fulcrum, will drop into the rack of the card carriage and will cause locking. The position of the two pawls 78 and 85 has been so chosen, that under the influence of spring 71 the carriage will slide for half a step to the left on the change-over from one pawl to the other (Fig. 7). If the back space key is released again the lever 86 will be fed to home position by spring 104 and therewith also the key lever 102. The pawl 85 is removed from the rack while the locking pawl 78 again assumes locking. During this change of teeth there will again occur half a step to the left so that during this action the carriage has moved backward for a whole skip, that is to say, to the right in Fig. 1.

Circuit diagram

Figure 13:
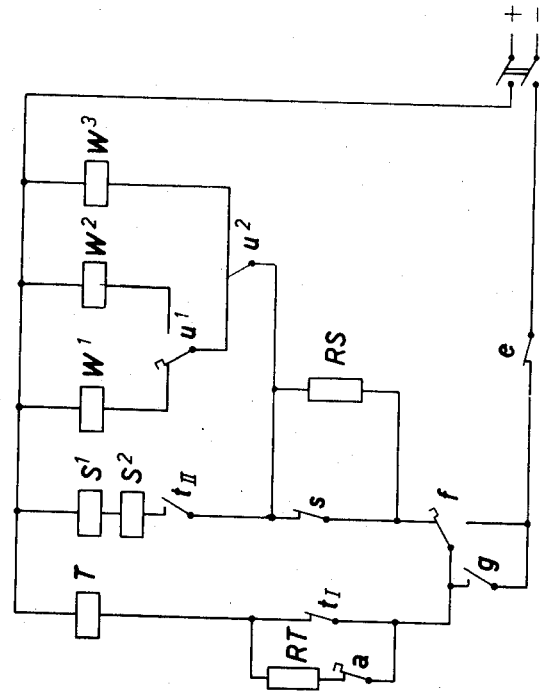
Fig. 13 shows the circuit diagram of the machine.

In the illustration of the circuit diagram (Fig. 13) for the punching machine a simplified conventional form has been chosen, as generally used in the art of communication. The relays and magnets are designated by capital letters and the contacts which they actuate by the corresponding small letters. Manually actuated contacts are characterized by a hook on the upper end of the movable contact member. Generally, the designations for the magnets, relays and contacts are so arranged that the characters are to the right or above the wiring symbol respectively.

At first it is assumed that the upper deck is selected and that the card is in the initial position (right hand position Fig. 1). If the machine is switched on and if a character key is actuated the contact $g$ is closed. Current will now flow from negative through the contacts $e$, $g$, $f$, $s$, $u^2$, $u^1$, through the selector magnet $W^1$ to positive. At the same time current will also flow from contact $g$ through the contact $t_I$, and the feed magnet T to positive. The selector magnet $W^1$ and the feed magnet T will respond. The feed magnet T will now open its contact $t_I$ and will close its contact $t_{II}$.

Now current will no longer flow through contact $t_I$ to the feed magnet T but through contact $a$ and the resistance RT. The latter has been provided in order to avoid that the high initial current will always flow through the feed magnet as long as the key is depressed thus, avoiding over-heating on too long a depression of the key.

By closure of the contact $t_{II}$ the current circuit through the punching magnets $S^1$, $S^2$ will be established so that the same will respond and will open the contacts $s$. The current will now no longer flow through the contact $s$ but through the resistance RS which will reduce the initial current of the punch magnet as well as of the selector magnet to the value necessary to maintain a holding circuit in order to avoid over-heating. The contact $t_{II}$ has been provided in order that the punch magnets can only respond if the feed magnet and the selector magnet have already responded. This is necessary since punching must not occur before the displacement of the translator bars 11 by the selector magnet and before the card feed has been completed. The contacts $t_I$ and $t_{II}$ are so adjusted that they will be actuated only in the last moment of the armature movement of magnet T.

According to the position of both of the contacts $u^1$ and $u^2$ which depends on the actuation of the keys 13, as has already been described, one of the three selector magnets $W^1$, $W^2$ and $W^3$ will be inserted in the current circuit which displaces the translator bars 11 of the associated deck.

If the skip key is actuated the contact $f$ is shifted whereby the feed magnet T will receive current through the contact $t_I$ and will respond. The current circuit to the selector or punching magnet respectively has however been interrupted in this case through the contact $f$ so that the magnets cannot respond.

On actuation of the release key 95 the contact $a$ will be opened and the contact $f$ will be shifted as has already been described. Hereby the card feed magnet will receive current through the contact $f$ and $t_I$ and will respond. Due to response to the magnet T the contact $t_I$ is opened and the current through the magnet T is interrupted since the contact $a$ is held open by the key. Accordingly the feed magnet T will drop and contact $t_I$ will close again so that the magnet T will receive current and will be energized. This action will be repeated until either the release key has been released or until the card carriage has reached the insertion position. In this position it opens the contact $e$ which interrupts the current circuit for the whole machine and therewith also the automatic interrupting action of magnet T.

I claim:

1. In a punching machine for multi-deck hole combinational record cards having a plurality of adjacent record columns in each deck, a card bed, punching means in said card bed and means for feeding the card on said card bed column by column past said punching means, a single set of key levers common to all decks and power driven punch actuating means rendered effective upon actuation of any of said key levers, the punching means comprising for each deck a row of punches for a single record column and the associated matrix, the rows of punches being arranged in alignment beneath the card in said card bed whereas the matrix is arranged above the card so as to leave the card visible with the exception of the portion covered by the matrix, a separate set of controlling bars for each row of punches including a controlling bar for each punch, said controlling bars being displaceable in longitudinal direction transversely of said row of punches below the same and adapted to establish upon displacement an operative connection between said punch actuating means and the associated punch so as to serve as punch selector bars, and said controlling bars being also provided as translator bars for translating a key actuation into a combinational control of said controlling bars, all sets of controlling bars being under the control of said single set of key levers common to all sets of controlling bars, and deck selection means for selecting any one of said sets of controlling bars for the operative connection between the associated set of punches and the punch actuating means.

2. In a punching machine for multi-deck hole combinational record cards having a plurality of adjacent record columns in each deck, a card bed, punching means in said card bed and means for feeding the card on said card bed column by column past said punching means, a single set of key levers common to all decks and power driven punch actuating means rendered effective upon actuation of any of said key levers, the punching means comprising for each deck a row of punches for a single record column and the associated matrix, the rows of punches being arranged in alignment beneath the card in said card bed whereas the matrix is arranged above the card so as to leave the card visible with the exception of the portion covered by the matrix, a separate set of controlling bars for each row of punches including a controlling bar for each punch, said controlling bars being displaceable relatively to said row of punches and adapted to establish upon displacement an operative connection between said punch actuating means and the associated punch so as to serve as punch selector bars, and said controlling bars being arranged transversely of said set of key levers and being also provided as translator bars for translating a key actuation into a combinational control of said controlling bars, all sets of controlling bars being under the control of said single set of key levers common to all sets of controlling bars, and deck selection means for selecting any one of said sets of controlling bars for the operative connection between the associated set of punches and the punch actuating means.

3. In a punching machine as set forth in claim 1, wherein each set of translator bars is provided with an individual displacing magnet and each of said displacing magnets is rendered effective by the operation of an associated deck selection key.

4. In a punching machine as set forth in claim 1, wherein the means for feeding the card on the card bed comprises a carriage and a gripper bar to grip the card against the carriage on its upper margin over its entire length.

5. In a punching machine as set forth in claim 1, wherein the translator bars are provided with noses on their lower edges in the path of lateral displacement of said bars and locking bars connected to the key levers and cooperating with said noses to hold the non-selected translator bars against displacement.

References Cited in the file of this patent

UNITED STATES PATENTS

| 1,195,605 | Powers | Aug. 22, 1916 |
| 1,994,315 | Keefe | Mar. 12, 1935 |
| 2,421,069 | Kelley et al. | May 27, 1945 |
| 2,397,605 | Holden | Apr. 2, 1946 |
| 2,566,931 | Cunningham et al. | Sept. 4, 1951 |

FOREIGN PATENTS

| 125,360 | Austria | Nov. 10, 1931 |